F. L. SMITH AND C. R. HAWKINS.
MILLING TOOL.
APPLICATION FILED NOV. 13, 1919.
1,410,350.
Patented Mar. 21, 1922.
2 SHEETS—SHEET 1.
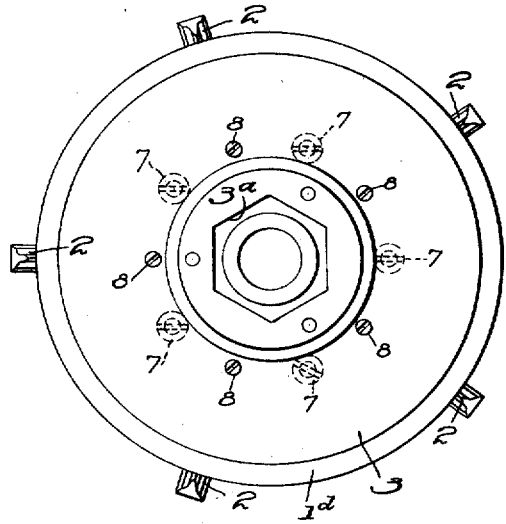
Fig.1.
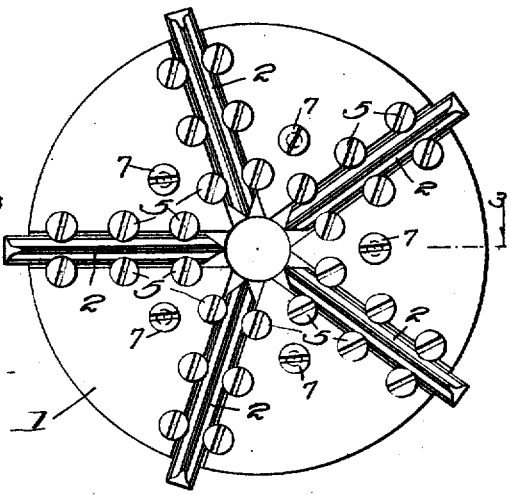
Fig.2.
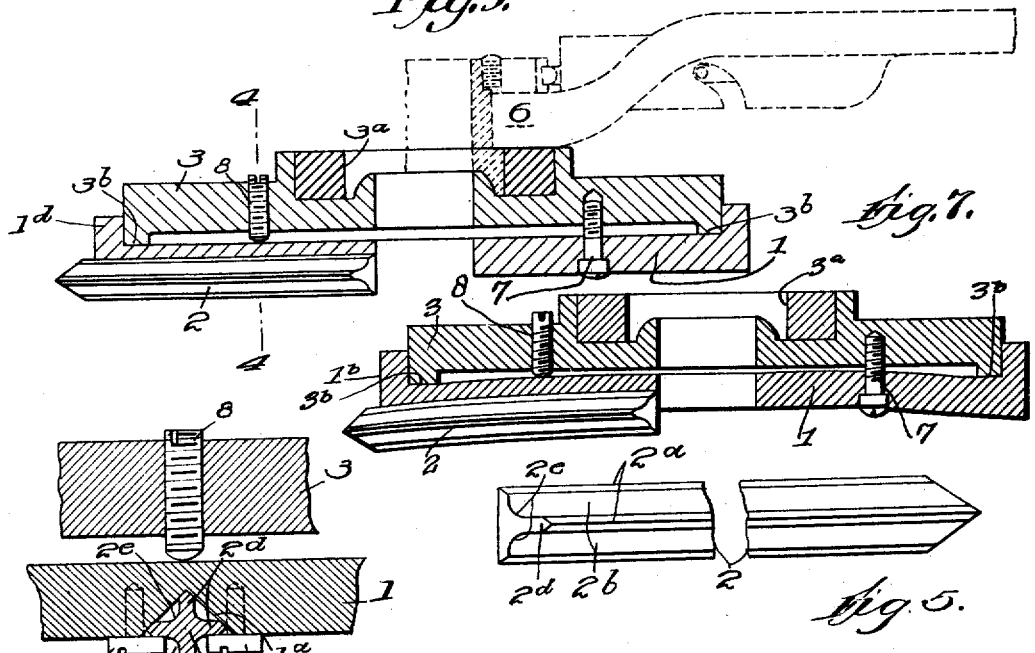
Inventors
Frank L. Smith and
Charles R. Hawkins,
by Burton & Burton
their Attys.
Witness:

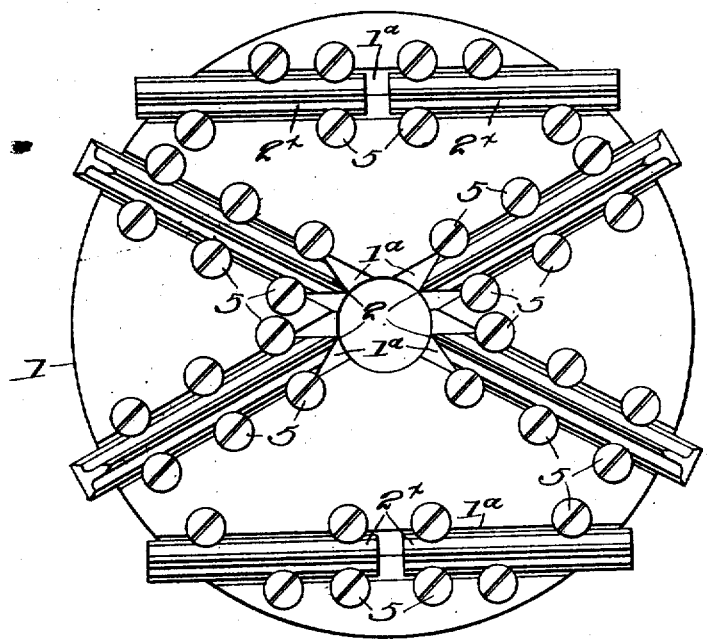

UNITED STATES PATENT OFFICE.

FRANK L. SMITH AND CHARLES R. HAWKINS, OF CHICAGO, ILLINOIS.

MILLING TOOL.

1,410,350.

Specification of Letters Patent. Patented Mar. 21, 1922.

Application filed November 13, 1919. Serial No. 337,850.

*To all whom it may concern:*

Be it known that we, FRANK L. SMITH and CHARLES R. HAWKINS, citizens of the United States, and residents of the city of Chicago, in the county of Cook and the State of Illinois, have invented certain new and useful Improvements in Milling Tools, of which the following is a specification, reference being had to the accompanying drawings, forming a part thereof.

The purpose of this invention is to provide an improved tool of the general character of a milling tool, particularly adapted for facing or finishing such surfaces, as valve seats, interior walls or tablets of meter casings, and the like, and particularly adapted to be operated by hand when mounted upon the work to be faced. It consists in the elements and features of construction shown and described, as indicated in the claims.

In the drawings:

Figure 1 is a top or back plan view of a tool embodying this invention.

Figure 2 is a face view of the same with cutters of a certain form mounted therein.

Figure 3 is a section at the line, 3—3, on Figure 2.

Figure 4 is a detail section at the line, 4—4, on Figure 3.

Figure 5 is a side elevation of one of the cutters.

Figure 6 is a face view of a cutter head having cutters of the special type mounted in a special arrangement on the face of the cutter head.

Figure 7 is a diagrammatic view similar to the sectional portion of Figure 3, showing on the graduated scale the curvilinear cutting edge and means for producing it by springing the holder plate.

The milling tool shown in the drawings comprises a cutter holder or cutter head 1, in which are held the cutters, 2, formed and secured as hereinafter described, and a mount, 3, for the cutter head or holder, 1, which mount is provided with means for rotating the entire tool. As illustrated in the drawings, these means consist of a hexagonal socket, $3^a$, in the back of the mount, adapted to receive the suitable hexagonal head of a ratchet key or hand rotor, 6, the detail construction of which forms no part of the present invention and will not be further described. The cutters, 2, are of general parallelepipedon form, of small cross section relatively to their length, having the longitudinal corners $2^a$, as cutting edges, and having the longitudinal sides between the cutting edges channelled as seen at $2^b$. Desirably for certain purposes, and suitably for most purposes, the cutters have an even number of corners as cutting edges, so that they constitute pairs, two of each pair being opposite to each other in the same plane, said plane intersecting in the longitudinal axis of the cutter. Preferably there are four corners constituting cutting edges, and the planes of the two pairs intersect at right angles; that is, the cutters are square in cross section, except as modified by the longitudinal grooves, $2^b$. The cutters are thus rendered four-point-star-shaped in cross section, comprising four longitudinally extending wings, $2^d$; and the grooves, $2^b$, are preferably made with their two sides at right angles, that is, parallel respectively, to the planes of the two pairs of cutting edges, said sides, however, not extending to meet at an angle, but connected by curves, seen at $2^e$, making a fillet in the angle between the two sides of the channel.

It is designed that all four cutting edges may be used, before re-grinding becomes necessary; and the holder is adapted for this purpose by having the right-angled-V-shaped grooves, $1^a$, to seat the cutters, and screws, 5, set into the face of the holder alongside the margin of these grooves with their heads overhanging the latter, to engage the cutters by the two wings, $2^d$, which are in the plane transverse to that of the edge which is protruded for cutting.

Whether employed for completely facing a seat or tablet, or for facing an annular seat around a central opening or central boss or post, it is essential that the inner ends of the several cutters carried by the holder in such work, shall have an end edge or corner extending at right angles to the plane of the face to be dressed,—that is, at right angles to the then operating cutting edge of the cutter; and to afford such an end edge or corner, the cutters are finished at the two opposite ends by beveling them to edges or corners in the planes of the pairs of longitudinal edges respectively; that is, one end has such end edge or corner in one of said planes, and the opposite end has like edge or corner in the other of said planes. With this construction, when shifting the cutter to bring into service a cutting edge in a plane transverse to that of the previously operating cutting edge, the cutter will be reversed endwise, as well as being turned ninety degrees about its axis.

An important function of this tool is its adaptation for making a slightly crowning surface on the face or tablet dressed by it. It is often desirable to produce such very slightly crowning surface, the swell or curvature amounting to as little as one one-thousanth of an inch in a diameter of several inches; and a cutter having its cutting edge normally thus slightly curved can not be ground to preserve the curvature, except by difficult and expensive means. Such crowning face is produced by this tool by means which will now be described.

The holder, 1, and the mount, 3, are centralized with respect to each other by a marginal flange on one of these parts within which the other of them telescopes. As shown, this flange is on the holder, designated, $1^d$. The interiorly telescoping one of said parts,—in the structure shown in the drawings, the mount, 3,—has a peripheral face flange, $3^b$, which seats on the facing surface of the other part,—the holder,—within the marginal flange, $1^d$, of said other part. The interior or facing surfaces of the two parts, holder and mount, are thus spaced apart by the height of the flange, $3^b$. The holder and mount are held to each other by screws, 7, equally spaced in a circle about the axis of the tool and about midway in the length of the radius, said screws being set through one of said parts and engaging the other. As illustrated, they are set through the holder and engage the mount. It will be seen that by tightening the screws, 7, the holder, 1, which is weakened at the lines of the grooves, $1^a$, can be sprung appreciably so as to be slightly dished or rendered concave outward; and the cutters, 2, held to the holder throughout their length by the screws, 5, will be correspondingly sprung lengthwise, and their cutting edges will be curved so that they will produce a crowning surface on the face or tablet dressed by them.

In order that such springing of the holder and cutters may not occur from the resistance of the work itself, so as to cut a crowning face when not desired, or a more crowning face than desired, there are provided stop screws, 8, set through the mount, directly back of the several grooves, $1^a$; and thereby the holder is reinforced at the lines of weakening caused by these grooves.

In operating a tool of this character for dressing a plain face of metal in which there are holes for screws or bolts or other recesses which reduce the total resistance encountered by the cutter at the zone or sector containing such holes, it will be observed that a cutter at radial or approximately radial position (which is a favorable position for certain reasons and purposes) tends to "dig in" or "gouge" while passing over these areas of diminished resistance. This action shows clearly in testing the surface after dressing; and when airtight fit is the purpose of the dressing, the gouge due to this cause is often too great to be negligible even though not visible to the eye. This defect is prevented or cured by providing in addition to the radial or approximately radial cutters, 2, shown in Figure 6, an additional cutter, or when the size of the head permits, a pair of cutters, $2^x$, which are each placed on a chord of a segment of the circle of operation of the tool of such angular extent as to cause the cutters so placed to operate with a pronounced draw-cut movement over the surface dressed. Usually a position at a chord of a segment of more than 90 degrees, and considerably less than 180 degrees gives the desirable action. In any case the zone of rotation of such segmentally placed cutter must overlap the zone of the radially or approximately radially placed cutter far enough to reach and to sweep over the holes or recesses which tend to cause the defects in action of the radially placed cutter. When the size of the tool permits the employment of the radial cutters in pairs, the segmentally placed cutters should be correspondingly in pairs; and in that case the segmentally placed cutters will preferably be parallel so as to sustain respectively the same angular relation to the corresponding cutters of the other pair; and their working edges will be in lines which produced will meet the lines of the working edges of the correspondingly radially placed cutter in a widely acute angle,—that is, a widely acute angle will be contained between the two edges produced. A desirable angle, in most cases, between the two cutters, segmental and radial,—is about 45 degrees.

In the above reference to "pairs" as applied to the radially or approximately radially positioned cutters, the two cutter members in line with each other at opposite sides of the center or central opening of the cutter head, (which central opening corresponds to a post or stud or undressed area of the work) are treated as a single cutter, a pair consisting of the two such two-piece cutters the lines of whose working edges intersect near the center of the tool. In respect to the segmentally placed cutters, similarly, the two pieces of which any one of these segmentally placed cutters may consist, which are in line with each other and carried in the same groove in the cutter head, are to be regarded as a single cutter, a pair consisting of two such two-piece cutters at opposite sides of the center. It will be understood that in case of segmental cutters, they are made in two pieces as shown, for the purpose of adjustment to increase the total area of cut, which may be done when the zone which they would leave undressed between their separated inner ends is within the sweep and zone of operation of the radial cutters and does not contain a bolt hole or aperture at which the radial cutter would gouge and require the correcting effect of the segmental cutter.

It will be observed also that when employing the segmental cutters in pairs, the two of each pair are desirably parallel at opposite sides of the center, and are also desirably situated symmetrically with respect to the radially placed cutters. Some departure from these rules of placing may be convenient and even necessary in certain circumstances or conditions imposed by the irregularities of the work, and may be made without departing from this invention.

We claim:—

1. A milling tool comprising a holder or cutter head having V-shaped channels for seating cutters, in combination with cutters in general of parallelepipedon form, adapted to be seated in said channels, said cutters having their longitudinal corners as the cutting edges and their longitudinal sides between said corners channeled, the remote sides of adjacent channels being substantially in the same plane, and retaining screws set into the face of the holder with their heads overhanging said V-shaped channels for engaging said remote sides of adjacent channels to bind the cutter in the V-shaped channels of the holder.

2. A cutter for a facing tool having two pairs of longitudinal cutting edges, the two of each pair being opposite each other, and the two pairs being in longitudinal planes which intersect at the longitudinal axis of the cutter, the opposite ends of the cutter being beveled to two transversely extending edges situated in said two planes respectively.

3. In a construction defined in claim 2, foregoing, the two planes being at right angles to each other.

4. In the construction defined in claim 2 foregoing, the longitudinal sides of the cutter between the cutting edges being longitudinally channeled.

5. In combination, a milling tool cutter having its cutting edge in the direction of its longest dimension, and its cross-section small relatively to said longest dimension; a holder for the same having means for engaging the cutter along its length; means for springing the holder out of its normal plane to dish it, and thereby spring the cutters held therein for curving their cutting edges.

6. A milling tool comprising in combination, a cutter having its cutting edge in the direction of its longest dimension, and its cross-section small relatively to said longest dimension, and a holder having a groove for seating the cutter and means for engaging the cutter at the side opposite its seat to hold it in the groove; a mount for said holder; means for spacing the holder and mount at part of their facing areas, and means for holding them together at another part of said areas; whereby the holder is dished and the cutters therein are longitudinally curved.

7. In the structure defined in claim 6 foregoing, the cutter being star-shaped in cross-section, an edge corresponding to one point of the star-shape being seated in the groove of the holder, and the engagement with the holder being by means of screws set in the face of the holder with heads overhanging two other of said star-shaped edges, the cutting edge being a star edge between said screw-engaged edges.

8. In the construction defined in claim 6 foregoing, the means for holding the holder to the mount being screws at opposite sides of the groove in the holder, and part of the means for spacing the holder and mount apart being a screw set through the mount impinging on the holder at a point directly back of the apex of the groove.

9. In a milling tool, means for producing a curvilinear cutting edge, comprising a holder plate, elongated cutters, means for securing the cutters on a holder plate, and means for springing the plate to dish it and bend the cutters lengthwise thereon.

10. A milling tool for facing plane surfaces comprising a cutter head having means for retaining the cutters thereon with their working edges in at least two widely different relations to radial direction, one being approximately radial and the other on the line of a segment chord which makes a relatively large acute angle to the first and having its zone of operation in the rotation of the tool, overlapping the zone of the first.

11. In the structure defined in claim 10, the approximately radial cutters being in pairs, the two of each pair having their working edges on lines intersecting near the center and segmentally placed cutters being in pairs which are symmetrically situated with respect to those of the first pair.

12. In the structure defined in claim 10 foregoing, the segmentally placed cutters being in pairs, two of each pair being parallel and symmetrically situated with respect to the axis of the tool.

In testimony whereof, we have hereunto set our hands at Chicago, Illinois, this 8th day of November, 1919.

FRANK L. SMITH.
CHARLES R. HAWKINS.